Sept. 21, 1965 C. B. BRAHM 3,207,952
CABLE FADE-IN CIRCUIT
Filed Dec. 19, 1961
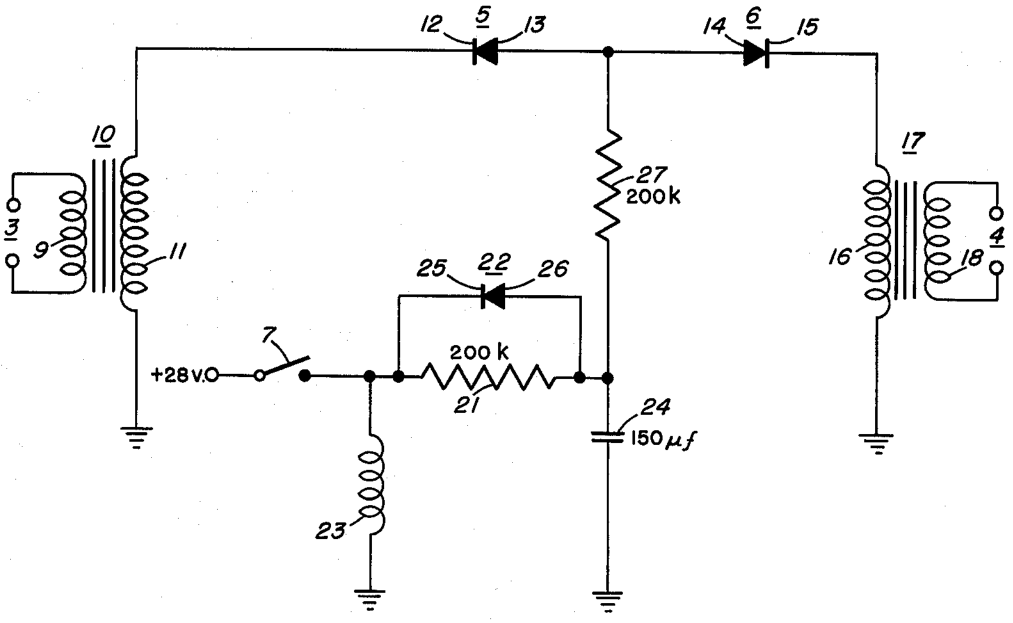
INVENTOR
CHARLES B. BRAHM
BY O. Baxter Warner
Claude Funkhouser
ATTORNEYS
Leonard L. Lourie
AGENT United States Patent Office 3,207,952

Patented Sept. 21, 1965

3,207,952

CABLE FADE-IN CIRCUIT

Charles B. Brahm, Ellington, Conn., assignor, by mesne assignments, to the United States of America as represented by the Secretary of the Navy Filed Dec. 19, 1961, Ser. No. 160,677
4 Claims. (Cl. 317—33)

The present invention relates generally to a signal transfer device and more particularly to a cable fade-in circuit.

When switching a signal from one line to another, for example, in communication equipment, switching from one channel to another; it has been found that large amplitude transient signals are generated immediately upon switching or initial loading of the line. Such transients are greatly in excess of normal operating ratings and are, therefore, quite detrimental to components in the newly switched-in line, possibly causing permanent damage thereto. Various schemes have been utilized to prevent this damage, one of which is to choose components whose power ratings will accommodate these transients. The obvious disadvantage of such a choice is the added cost, weight, and the like, of the higher rated components. Applicant's invention obviates the need for components of high ratings by providing a fade-in circuit at the point of interconnection. A fade-in circuit is one which, rather than shocking the new channel with a full strength signal and its associated transient signals, immediately upon switching, gradually increases signal strength from a value of zero at the time of switching until a full strength signal is allowed to pass shortly after the time of switching.

The device of the present invention has further utility in applications where fading of signals is desired. The most well-known application of this nature occurs when one television camera is substituted for another. Rather than an abrupt switching a gradual fading from one scene to another is often desired. Applicant's device serves to fade-in the camera desired to be used.

An object of the present invention is to provide a fade-in circuit for allowing large cable signals to build up gradually before permitting transfer thereof.

Another object of the present invention is to provide a fade-in circuit for causing a lag in the transfer of any large cable signals to prevent shocking of any amplifier.

Other objects and many of the attendant advantages of this invention will be readily appreciated as the same becomes better understood by reference to the following detailed description when considered in connection with the accompanying drawing wherein:

The single figure is a schematic diagram of an embodiment of the present invention.

Referring to the single figure of the drawing, the fade-in circuit is shown for transferring a cable signal from the input 3 to the output 4 upon operation of blocking diodes 5 and 6 as gating means with the application of a biasing potential when the coupler switch 7 is engaged.

A cable input signal on the input 3 is fed to the primary 9 of the input coupling step-up transformer 10 of ratio 1 to 2.25 having its secondary winding 11 connected between ground and the cathode 12 of diode 5. The anodes 13 and 14 of diodes 5 and 6 are connected together. The cathode 15 of diode 6 is connected to the output coupling step-down transformer 16 of ratio 2.25 to 1 having its primary 17 connected between the cathode 15 and ground. The transformed cable signal is fed to other electronic units or amplifier circuits from the secondary 18 of transformer 16 through the output 4.

Under normal operation of the fade-in circuit, any cable signal is not transferred to the output transformer

16 until a biasing potential is applied to anodes 13 and 14 of diodes 5 and 6 causing the diodes to go into conduction. In the conduction state, the diodes act like resistors whereby the cable signal is not blocked but readily transferred to the output transformer.

A 28 volt biasing potential is connected by switch 7 and applied through an RC network to the anodes of diodes 5 and 6. This network has a resistor 21 and diode 22 connected in parallel between a coil 23 and capacitor 24 the other ends of coil 23 and capacitor 24 being grounded. One end of resistor 21, cathode 25 of diode 22 and coil 23 are connected to switch 7. The other end of resistor 21, anode 26 of diode 22, and capacitor 24 are attached to resistor 27 which is connected to the anodes 13 and 14 of diodes 5 and 6 respectively.

The fade-in circuit on the closing of switch 7 causes the biasing potential of 28 volts to build up slowly by charging capacitor 24 through resistor 21 to a certain magnitude whereby the diodes 5 and 6 are put into conduction. Initially, the biasing potential to the diodes 5 and 6 is zero, but then builds up exponentially until diodes 5 and 6 are freely conducting. The voltage at the junction of anodes 13 and 14, to cause full conduction through the diodes 5 and 6, is dependent upon the charge built up across capacitor 24. The time required to fully charge this capacitor is dependent upon the value of the combination of resistor 21 and capacitor 24. The "time-constant" of an RC network of this nature is generally defined as the time required for a 63% charge of the capacitor. After 5 time-constants have elapsed,, the capacitor is substantially fully charged. Therefore, due to this lag effect of the conduction of the diodes, the large cable input signal will come through or pass only when the bias potential has reached certain magnitude. With the fading in of a large cable signal, any step-like voltage change or transient voltage generated immediately upon transfer of the signal to output 4 is blocked from passage thereto.

When the biasing potential is removed by the opening of switch 7, the diode 22 across resistor 21 provides a very quick discharge path for the charge on capacitor 24 through diode 22 and coil 23 to ground whereby the diodes 5 and 6 being now non-conducting block any input cable signal from being transferred.

High value impedances are used in the fade-in circuit to prevent loading of the circuit. Any loading would cause excessive attenuation of the transformed cable signal.

The fade-in circuit of the present invention could be used as a fail-safe circuit since no signal will pass from the input to the output if there is no bias on the diodes.

Obviously many modifications and variations of the present invention are possible in the light of the above teachings. It is therefore to be understood that within the scope of the appended claims the invention may be practiced otherwise than as specifically described.

What is claimed is:

1. A cable fade-in circuit comprising input transformer coupling means, an output transformer coupling means, blocking means preventing the transfer of signals from said input means to said output means, said blocking means comprising back-to-back diodes connected between said input and output means, biasing coupling means connected to the anodes of said diodes, said biasing coupling means comprising a slow charging path of a resistor and capacitor for connecting a biasing potential to said anodes whereby large cable signals are only allowed to pass when the biasing potential has reached a certain magnitude.

2. A cable fade-in circuit comprising input transformer coupling means, an output transformer coupling means, blocking means connected between said input and output means, said blocking means comprising back-to-back diodes, biasing coupling means connected to the anodes of said diodes, said biasing coupling means comprising slow charging means of a resistor and capacitor for connecting a biasing potential to said anodes, said charging means creating a slow build up of biasing potential on said anodes causing said diodes to conduct at a certain potential magnitude whereby said blocking means prevent the passage of large cable signals at said input means from passing to said output means until said biasing potential reaches a certain magnitude.

3. The fade-in circuit of claim 2 wherein said biasing coupling means include rapid discharge means for said capacitor after said biasing potential is disconnected from said charging means.

4. A cable fade-in circuit comprising gating means for blocking input cable signals, said gating means including back-to-back diodes with the anodes of said diodes connected together, delay biasing means connected to the anodes of said diodes, a coupler switch for coupling the biasing potential to said delay biasing means, said delay biasing means comprising an RC network of a resistor and capacitor for delaying the build up of biasing potential on said anodes on the closing of said switch, and a rapid discharge means for said capacitor on opening of said switch comprising a third diode across said resistor in series with a coil, the other side of said coil connected to ground potential.

References Cited by the Examiner

UNITED STATES PATENTS

| | | | |
|---|---|---|---|
| 1,977,595 | 10/34 | Roder. | |
| 2,535,303 | 12/50 | Lewis | 307—88.5 |
| 2,877,451 | 3/59 | Williams | 307—88.5 |

SAMUEL BERNSTEIN, *Primary Examiner.*